United States Patent Office 2,986,462
Patented May 30, 1961

2,986,462

PROCESS FOR THE PRODUCTION OF METALS

Maurice Morgan Wright, Rossland, British Columbia, Canada, assignor to The Consolidated Mining and Smelting Company of Canada Limited, Montreal, Quebec, Canada, a company of Canada No Drawing. Filed Oct. 10, 1957, Ser. No. 689,264

6 Claims. (Cl. 75—84.5)

This invention relates to a process for producing polyvalent metals from their halides, and is particularly directed to the production of such metals substantially free from impurities.

The metals which can be produced by the process of the present invention include the following: titanium, zirconium, hafnium, vanadium, niobium, tantalum, chromium, molybdenum, tungsten, thorium, uranium, germanium and iron. A common characteristic of these metals is that they all have more than one valence state and therefore halides of these metals exist in more than one valence state. Further common characteristics of these metals are that all have relatively high melting points and all are produced as powders which are reactive in varying degree with oxygen, nitrogen, carbon and water when their halides are reduced at relatively low temperature. Therefore it is usually necessary that the metal powder be stabilized by sintering or agglomeration at a relatively high temperature.

It is well known that in the case of at least some of the metals listed above the metal of interest can be produced in elemental form by reduction of a halide. For example, titanium can be produced by reacting titanium tetrachloride with sodium in an inert atmosphere in a single reducing operation at temperatures in the range of 200° C. to 800° C. The metal in elemental form is recovered from the reaction product, which contains titanium metal and sodium chloride, for example, by leaching the reaction product with water or dilute acid solution. Alternatively, sodium chloride and excess sodium, if present in the reaction product, can be removed by distillation under vacuum at 900° C. to 1000° C. In the processes of the prior art, the halide is completely reduced in a single stage at relatively high temperatures. As the reduction is usually exothermic, the heat evolved must be dissipated to control the temperature within desired limits for convenience of operation and to prevent contamination of the metal produced by materials of construction. A subsequent metal stabilizing step must usually be provided by heating the reduction product to an elevated temperature to effect agglomeration or consolidation of the metal particles.

The disadvantages of the prior art processes are overcome by the two-stage process of the present invention. In this two-stage process, a halide of the desired metal is partially reduced with a reducing agent in a first stage to form a homogeneous mixture which comprises metal sub-halide, reducing agent and the halide of the reducing agent. This mixture is heated in a second stage to initiate a further reducing reaction which occurs spontaneously and completes the reduction to the desired metal product. Sufficient heat is generated in the course of the reducing reaction to raise the temperature high enough to stabilize the metal produced by the reaction.

The term "sub-halide" is used herein to refer to metal halides in which the valence state of the metal of interest is less than the valence state of that metal in the primary halide form, that is, the halide form from which the sub-halide is produced by partial reduction. The primary halide is an initial reactant in the process of the present invention and at least some of the primary halide is partially reduced in the first stage of the process to sub-halide.

The halide used in the process of this invention can be the fluoride, chloride, bromide or iodide, but for convenience and economy the chloride is usually preferred.

The reducing agent used in the process can be an alkali metal or an alkaline earth metal, including magnesium, but excluding beryllium which does not provide sufficient heat of reaction. Sodium and magnesium are usually the preferred reducing agents in the processes for producing metals from their halides, as they have strong reducing properties and are readily available in pure form and at relatively low cost. Aluminum is not a suitable reducing agent in the present process in view of the low boiling point of its chloride, the possibility of forming aluminum compounds with the metal of interest, and the relatively small amount of heat, if any, generated.

The reducing reactions in both the first stage and the second stage of the present process are exothermic. The heat of reaction can be controlled to some extent, by the choice of reducing agent and halide used in the process, for example, more heat will be generated when using sodium as a reducing agent with a chloride than when using sodium as a reducing agent with an iodide. However, for practical purposes sodium as the reducing agent and a chloride as the halide are the preferred reactants in most cases as they are relatively cheap, readily available in pure form and relatively easy to handle. The heat of reaction can be easily controlled, where necessary, by other means than choice of reactants.

The reduction of the halides of the metals listed above using the reducing agents noted above is exothermic and therefore heat can be internally generated within the reaction system. The process of the present invention realizes the potential advantages of this internal generation of heat. Using the present process, a skull melting technique can be employed wherein the reaction mass is melted within a lining of inert material, such as sodium chloride, thereby preventing contamination of the desired metal by materials of construction. The process also enables high temperatures to be attained and utilized during the final reduction to produce metal, so that the metal particles formed can be stabilized by agglomeration or consolidation. This stabilization effect is particularly important with metals such as titanium and zirconium which are highly reactive with oxygen, nitrogen, carbon and water.

To realize these advantages the reactants during final reduction to metal should be in the form of a homogeneous mixture, that is, a mixture in which the reactants are uniformly distributed throughout the mixture. The reactants should be in the form of a mixture to avoid the difficulties and disadvantages of attempting to introduce the reactants separately into a vessel at high temperature. The final reaction mixture for the production of metal should be homogeneous to ensure close proximity between reactants and to utilize efficiently the reaction heat generated by the reduction to metal. Mixtures that are non-homogeneous are undesirable as generation of heat is relatively inefficient and complete reaction may not occur in this type of process. If a reactant or intermediate product in such non-homogeneous mixtures is volatile under reaction conditions, the reaction vessel system may be subjected to undue pressure, or even explosion, before the reaction has been completed.

The primary object of the present invention is to produce metal of high purity uncontaminated by impurities derived from materials of construction.

A further object of the invention is to provide a process in which the heat generated by the reactions of the process can be utilized to produce the metal of interest in stable form.

A still further object of the invention is to provide an economic and readily operable process for the production of the metal of interest from a halide of the metal.

These and other objects are attained by the two-stage process, described in detail hereinafter, in which a homogeneous reaction mixture is prepared at a relatively low temperature from primary reactants by partial reduction in a first stage, and the metal of interest is obtained from the homogeneous reaction mixture by further reaction of the mixture in a second stage.

The production of titanium is employed to illustrate in detail the operation of the process of this invention, but the process can be employed with advantage for the production in pure form of the other metals listed above.

The reduction of titanium tetrachloride to titanium in elemental form, using sodium as a suitable reducing agent, is represented by the equation $$TiCl_4 + 4Na \rightarrow Ti + 4NaCl$$

In the processes of the prior art, this reaction has been carried out at a relatively high temperature, for example, 480° C. to 620° C., and at about 800° C. At lower temperatures, for example, at about 200° C. and lower, the reduction is incomplete and sub-chlorides are formed. Therefore it has heretofore been considered impractical to operate at relatively low temperatures.

Despite this prevailing view, I have found that important advantages can be gained by operating a two-stage process, deliberately effecting only a partial reduction in the first stage at a relatively low temperature, and completing the reduction in a second stage at a relatively high temperature. This two-stage process is illustrated by the following equations:

$$TiCl_4 + 4Na \rightarrow TiCl_x + (4-x)NaCl + xNa \quad (1)$$
$$TiCl_x + (4-x)NaCl + xNa \rightarrow Ti + 4NaCl \quad (2)$$

wherein $x$ is a number which represents the average valence state of the titanium in the mixture produced by the first-stage reaction. Depending on how the first-stage reaction is conducted, this number may be as high as 3 or as low as slightly above zero, but is usually found to be between 2 and 2.5. It is necessary that the average valence state be of the order of 2 or more if the metal is to be produced in stable form in the second stage without the use of extraneous heat.

The first-stage reaction represented by Equation 1 is conducted at a relatively low temperature, for example, below 200° C. The product formed comprises, essentially, a homogeneous mixture of titanium sub-chlorides, sodium chloride and unreacted sodium.

This homogeneous intermediate product is subjected to the second stage of the process. In this second stage, the temperature of the intermediate product is raised to initiate the reaction represented by Equation 2. This reaction occurs spontaneously when the initiation temperature has been reached, and is allowed to proceed substantially adiabatically to take advantage of all the heat generated by the reaction. The initial temperature will vary depending on the conditions of preparation of the first-stage product, e.g., degree of reduction of the primary halide and amount of excess sodium, but is usually below 300° C. The temperature attained during the course of the second-stage reaction will also vary according to conditions, but preferably these conditions are controlled to provide a sufficiently high temperature to stabilize the metal produced. With titanium, this stabilizing temperature is of the order of 800° C. to 900° C.

The reaction product of the second stage of the process is titanium in elemental form, sodium chloride and, usually, excess sodium. The sodium chloride and, when originally present, excess sodium can be separated from the titanium by known methods, such as evaporation, or decantation of the sodium chloride melt and water leaching of the metal particles.

In the operation of this improved process it is preferred to use sodium, or other reducing agent, in excess of the theoretical amount required for complete reduction of the primary halide, and it is preferred to add all the reducing agent to the first stage. Some reducing agent can be added in the second stage, if desired, but a less homogeneous mixture would be obtained for treatment in that stage. An excess of reducing agent of the order of 100% or more can be used, but for practical purposes an excess of about 5% to 15% of the theoretical amount is found to be satisfactory.

The first stage of the process can be carried out in several different ways. For example, liquid titanium tetrachloride can be added to a dispersion of metallic sodium in an inert liquid organic medium, such as a hydrocarbon, preferably a saturated straight chain liquid hydrocarbon, such as n-octane. In this case, it is convenient to maintain the temperature at or slightly below the normal boiling point of n-octane, 125° C. but above the melting point of sodium, 97.5° C. The reaction is exothermic and very rapid. Heat can be removed and the temperature thereby controlled either through the evaporation and reflux of the n-octane medium, if at the boiling point, or by heat transfer to a cooling medium if below the boiling point. The first stage reaction product can be recovered as a dry free-flowing powder by removing the n-octane medium by filtration and evaporation at 25° C.

The first stage can also be carried out by reacting titanium tetrachloride gas at the surface of a pool of liquid sodium at a temperature above the melting point of sodium but below 200° C., e.g. 110° C. Titanium tetrachloride gas is admitted to the reactor which contains the pool of sodium and reduction takes place at the surface of the pool. As a layer of reaction product forms on the surface of the pool, this layer is broken by a slow raking or stirring action to expose fresh surfaces and to permit further reaction between sodium and titanium tetrachloride to take place.

A third way in which the first stage of the process can be carried out is by reacting titanium tetrachloride gas with sodium which is present as a film on a bed of sodium chloride particles. This bed can be mechanically stirred or it can be fluidized by an inert gas such as argon. Again the reactor temperature is maintained above the melting point of sodium but below 200° C., e.g. 120° C. As the reactants are added and the reaction product accumulates the composition of the bed approaches the composition of the reaction products.

In the second stage of the process reduction to metal is completed, for example, in accordance with the reaction illustrated by Equation 2 above. If the process is conducted on a batch basis, the temperature of the first-stage reaction product is increased to that at which the second-stage reaction is initiated. This usually is below about 300° C., e.g., 125° C. to 250° C., depending on the conditions of preparation of the first-stage product. At the initiation temperature, the second-stage reaction occurs spontaneously, spreading throughout the reaction mass until the titanium subchlorides have all been reduced to titanium metal, with concurrent conversion of sodium to sodium chloride. If the process is conducted on a continuous basis, charge material can be fed continuously or intermittently into the first reaction vessel and reaction product from the first stage can be withdrawn continuously or intermittently and passed to a second reaction vessel in which the second stage is conducted.

The second-stage reaction vessel can be constructed with provision for cooling the walls whereby a lining of solid sodium chloride coats the inner surfaces of the reaction vessel at all times.

In the second stage, it is merely necessary to increase the temperature of the first-stage reaction product in an atmosphere of argon until the second-stage reducing action commences spontaneously. The reaction is exothermic and is allowed to proceed adiabatically. The temperature tends to increase rapidly to about 800° C. to 1200° C. depending on heat losses and on the reaction heat available in the first-stage product, which, in turn depends on the composition of this product. The time of retention in the second stage sufficient to ensure a stable product will vary from a few seconds to about two hours depending on the maximum temperature attained.

The invention is, of course, independent of theory. However, a reasonable explanation of the course of the reactions which take place in the first stage is that the surface of the sodium is first coated with a thin film of elemental titanium and sodium chloride produced by complete reduction of titanium tetrachloride at the sodium surface. The titanium thus formed on the sodium surface then reacts with further titanium tetrachloride to produce a surface film of a reaction product in which the average valence state of titanium is from 2 to 3 depending on the extent of the reactions:

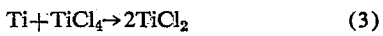

$$Ti + TiCl_4 \rightarrow 2TiCl_2 \quad (3)$$

and

$$TiCl_2 + TiCl_4 \rightarrow 2TiCl_3 \quad (4)$$

In any case, in the first stage of the two-stage reduction process the primary halide of the metal of interest is only partially reduced.

The process of the present invention can be considered as one in which the heat generated by the reaction between the metal halide and the reducing agent is released in two stages. In the first stage, heat is isothermally released at a relatively low temperature, for example, below about 200° C., and discharged from the system. In the second stage, the heat generated is released adiabatically, permitting the system to attain a temperature high enough to ensure stabilization of the metal produced.

The equipment used in the process is flushed with an inert gas. An inert atmosphere is maintained in the first and second reaction stages of the process. Argon is suitable for this purpose. Normal pressures, about atmospheric, are preferred as a matter of convenience. A high vacuum during the second-stage reaction should be avoided as it would tend to result in the evolution of volatile halides, e.g. by favouring disproportionation of titanium sub-halides according to Reactions 3 and 4, with the release of volatile $TiCl_4$.

Mild steel is suitable as a material of construction for vessels used in both stages of the process.

The operation of the process is illustrated by the following example:

*Example*

A dispersion of liquid sodium in n-octane was prepared by adding 12.5 grams of sodium to 400 cc. of n-octane and agitating the mixture at a temperature of from about 110° C. to about 115° C. The size range of the sodium particles was within the range of from about 20 to 100 microns. Titanium tetrachloride in liquid form and in the amount of 24.5 grams was added dropwise to the dispersion of liquid sodium in n-octane. The temperature of the mixture was maintained within the range of from about 110° C. to about 115° C. by controlling the rate of addition of $TiCl_4$. The amount of sodium used was about 5% more than that theoretically required for complete reduction of the $TiCl_4$. This reaction was carried out under a cover of argon and at atmospheric pressure.

After the addition of titanium tetrachloride was complete, agitation was stopped and the reaction product allowed to settle. The reactor contents were then allowed to cool to approximately room temperature and the n-octane separated from the reaction product by decantation, filtration, and finally evaporation under vacuum. The reaction product was a dark homogeneous free-flowing powder composed of sodium chloride, titanium sub-chlorides, and metallic sodium. These operations were carried out under an argon cover. The powder was stable at room temperature in an argon atmosphere.

This first-stage reaction product was then heated in an electrically-heated steel vessel, under argon cover, at about 1 atmosphere absolute pressure, in order to initiate the second-stage reaction. The reaction was initiated at about 145° C., followed by spontaneous reaction throughout the entire reaction mass and concurrent generation of heat. The reaction heat available in the first-stage reaction product as determined in a calorimeter was 100 kilogram calories per mol of titanium tetrachloride added to the first stage. This was sufficient energy to raise the product of the second-stage reaction to approximately 1150° C., if there were no heat losses.

In the present example, the second-stage reaction product was held at about 825° C. for 1 hour in order to consolidate the particles of titanium metal. The vessel and contents were then cooled to room temperature.

Titanium was recovered from the sintered mass as coarse, grey particles by dissolving the sodium chloride and excess sodium in water. The titanium metal recovered represented 91% of the titanium contained in the titanium tetrachloride charged into the first stage of the process.

In a modification of the first stage of the process, gaseous titanium tetrachloride was reacted with molten sodium dispersed as a surface film on a bed of sodium chloride particles which were mechanically stirred under argon cover at 115° C. to 120° C. Again the product was a dark, homogeneous, free-flowing powder. This powder was heated under argon as in the previous example to initiate the second-stage reaction. The initiation temperature in this case was 220° C.

In this modification, a fluidized bed can be used instead of a mechanically agitated bed. Argon is the preferred fluidizing gas.

In a further modification of the first stage, gaseous titanium tetrachloride was brought into contact with the surface of a pool of liquid sodium. The operation was conducted at atmospheric pressure and under an atmosphere of argon. The reaction product removed from the surface of the pool was heated as in previous examples to complete the second-stage reaction, the heat generated in this case being sufficient to raise the temperature of the reaction mass to red heat.

Still other modifications may be employed to carry out the first stage of the process. The reducing agent may be solid or liquid and the conditions of operation may be chosen in accordance with the properties of the primary halide used. In the case of the example noted above using n-octane, liquid reducing agent and liquid primary halide were used at about 115° C. Lower temperatures can be used, if desired, with solid reducing agent or, preferably, with a liquid reducing agent such as potassium or a sodium-potassium alloy. Higher temperatures can also be used by selecting a hydrocarbon with a higher boiling point or by operating the first-stage according to some other modification.

The primary halide may be a solid, liquid, or gas but as the first stage is preferably operated at a relatively low temperature, for example, below 200° C., the state of the primary halide fed to the first stage may be determined by its melting and boiling points. For example, thorium tetrachloride has a high melting point and is preferably used in the solid state. In the modification in which the reducing agent is dispersed in an inert liquid medium, the medium is preferably, but not necessarily, one in which the primary halide is soluble, as is titanium tetrachloride in n-octane.

The two-stage process of the present invention for producing the metals listed above from halides thereof offers a number of important advantages over the single stage processes of the prior art. The two-stage process is adaptable to continuous operation because the primary reactants are combined at a low temperature; the reaction heat of the second stage is utilized to complete the reduction at a high temperature, thereby stabilizing the metal produced, and thus obviating the need for a subsequent separate stabilizing step which employs extraneous heat; and there is little or no need to control the upper temperature attained in the second stage. In the processes of the prior art, the primary halide is completely reduced in a single stage at relatively high temperatures but the heat must be dissipated to control the temperature within desired limits for convenience of operation and to prevent contamination of the metal produced by the materials of construction, and a subsequent metal stabilizing step which uses extraneous heat must be provided as it is not usually convenient to operate the single-stage processes at stabilizing temperatures.

In the n-octane modification of the first stage of the present process heat can be removed and the temperature can thereby be controlled by evaporation and reflux of the n-octane.

Stabilization of the metal product obtained in the second stage of the present process is effected by merely extending the time of retention of the product in the second stage at the high temperature attained in that stage by the heat autogenously generated by the reaction.

The first-stage product and the second-stage product are easily handled and can be easily removed from reaction vessels. The first-stage product is usually a free-flowing powder, unreactive at room temperature under argon.

The second-stage product can be produced in large or small batches continuously or intermittently. With large batches, the skull melting technique can be used and the second-stage product can be tapped from the vessel as a suspension of solid metal in molten halide and reducing agent, for example, solid elemental titanium in a molten mixture of sodium chloride and sodium. After decanting the melt, which can be recycled to an electrolytic cell for the production of reducing agent, the metal can be readily separated from remaining halide and reducing agent by leaching with water or dilute acid solution.

When the second-stage reaction is conducted in small batches, and therefore with relatively high heat losses, the reaction product cools rapidly and after cooling is in the form of a porous, sintered mass which has shrunk away from the walls of the vessel and can therefore be easily removed from the vessel.

One of the disadvantages of the prior art processes that the process of the present invention overcomes is adherence of the metal produced to the walls of the reaction vessel with consequent difficulties in removing the metal and danger of contaminating it by the materials of the reaction vessel.

It will be understood, of course, that modifications can be made in the preferred embodiment of the process described herein without departing from the scope of the invention as defined by the appended claims.

What I claim as new and desire to protect by Letters Patent of the United States of America is:

1. In a process for the production of a polyvalent metal from a primary halide thereof by a two-stage reduction of the primary halide with a reducing agent selected from the group consisting of the alkali metals and the alkaline earth metals wherein the primary halide is reduced in a first stage to sub-halide according to a first stage exothermic reaction and the sub-halide is reduced in a second stage to metal according to a second stage exothermic reaction, the improvement which comprises the steps of adding said reducing agent to the first stage in at least the stoichiometric amount required for complete reduction of the primary halide to metal in elemental form; maintaining the temperature of said first stage reaction below about 200° C.; continuing said first stage reaction to produce a homogeneous reaction mixture composed of metal sub-halide with a metal valence not more than 3, reducing agent and halide of the reducing agent, increasing the temperature of said homogeneous mixture in a second stage to about 300° C. to initiate an exothermic second stage reduction reaction; continuing said second stage reduction reaction adiabatically whereby the heat of reaction is retained within said second stage and the second stage reaction product is heated to a temperature above about 800° C. thereby stabilizing the polyvalent metal produced; and separating and recovering the polyvalent metal from the second stage reaction product.

2. The process according to claim 1 in which the halide is the chloride.

3. The process according to claim 1 in which the halide is the chloride and the metal is titanium.

4. The process according to claim 1 in which the halide is the chloride, the metal is titanium and the reducing agent is a member selected from the group consisting of sodium, potassium and alloys of sodium and potassium.

5. The process according to claim 1 in which the first stage reducing reaction is conducted by introducing the primary halide into a dispersion of the reducing agent in an inert fluid medium.

6. The process according to claim 1 in which the first stage reducing reaction is conducted by introducing titanium tetrachloride into a dispersion of sodium in n-octane at a temperature above the melting point of sodium but not higher than the boiling point of n-octane at the prevailing pressure.

References Cited in the file of this patent

UNITED STATES PATENTS

| | | |
|---|---|---|
| 2,703,752 | Glasser et al. | Mar. 8, 1955 |
| 2,765,270 | Brenner et al. | Oct. 2, 1056 |
| 2,791,499 | Clegg | May 7, 1957 |
| 2,816,817 | Stein et al. | Dec. 17, 1957 |
| 2,824,799 | Hansley et al. | Feb. 25, 1958 |
| 2,826,493 | Garrett | Mar. 11, 1958 |
| 2,827,371 | Quin | Mar. 18, 1958 |
| 2,828,199 | Findlay | Mar. 25, 1958 |

FOREIGN PATENTS

| | | |
|---|---|---|
| 152,033 | Australia | June 24, 1953 |